United States Patent
Rowlands et al.

(10) Patent No.: US 10,749,811 B2
(45) Date of Patent: Aug. 18, 2020

(54) INTERFACE VIRTUALIZATION AND FAST PATH FOR NETWORK ON CHIP

(71) Applicant: NetSpeed Systems, Inc., San Jose, CA (US)

(72) Inventors: Joseph Rowlands, San Jose, CA (US); Joji Philip, San Jose, CA (US); Sailesh Kumar, San Jose, CA (US); Nishant Rao, San Jose, CA (US)

(73) Assignee: NetSpeed Systems, Inc., San Jose, CA (US)

(*) Notice: Subject to any disclaimer, the term of this patent is extended or adjusted under 35 U.S.C. 154(b) by 0 days.

(21) Appl. No.: 15/903,557

(22) Filed: Feb. 23, 2018

(65) Prior Publication Data

US 2018/0183722 A1    Jun. 28, 2018

Related U.S. Application Data

(63) Continuation of application No. 15/829,749, filed on Dec. 1, 2017, now abandoned.
(Continued)

(51) Int. Cl.
*H04L 12/801* (2013.01)
*H04L 12/913* (2013.01)
(Continued)

(52) U.S. Cl.
CPC ............ *H04L 47/39* (2013.01); *H04L 47/724* (2013.01); *H04L 49/109* (2013.01);
(Continued)

(58) Field of Classification Search
CPC ...... H04L 47/39; H04L 49/254; H04L 49/109; H04L 47/724; H04L 49/251; H04L 47/6275
See application file for complete search history.

(56) References Cited

U.S. PATENT DOCUMENTS

| 4,409,838 A | 10/1983 | Schomberg |
| 4,933,933 A | 6/1990 | Dally et al. |

(Continued)

FOREIGN PATENT DOCUMENTS

| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Ian N Moore
*Assistant Examiner* — Rushil Parimal Sampat
(74) *Attorney, Agent, or Firm* — Spectrum IP Law Group LLC

(57) ABSTRACT

Example implementations described herein are directed to a configurable Network on Chip (NoC) element that can be configured with a bypass that permits messages to pass through the NoC without entering the queue or arbitration. The configurable NoC element can also be configured to provide a protocol alongside the valid-ready protocol to facilitate valid-ready functionality across virtual channels.

19 Claims, 15 Drawing Sheets

Related U.S. Application Data

(60) Provisional application No. 62/429,695, filed on Dec. 2, 2016.

(51) Int. Cl.
  *H04L 12/933* (2013.01)
  *H04L 12/937* (2013.01)
  *H04L 12/865* (2013.01)
  *H04L 12/947* (2013.01)

(52) U.S. Cl.
  CPC ........ *H04L 49/254* (2013.01); *H04L 47/6275* (2013.01); *H04L 49/251* (2013.01)

(56) References Cited

U.S. PATENT DOCUMENTS

| | | | |
|---|---|---|---|
| 5,105,424 | A | 4/1992 | Flaig et al. |
| 5,163,016 | A | 11/1992 | Har'El et al. |
| 5,355,455 | A | 10/1994 | Hilgendorf et al. |
| 5,432,785 | A | 7/1995 | Ahmed et al. |
| 5,563,003 | A | 10/1996 | Suzuki et al. |
| 5,583,990 | A | 12/1996 | Birrittella et al. |
| 5,588,152 | A | 12/1996 | Dapp et al. |
| 5,764,740 | A | 6/1998 | Holender |
| 5,790,554 | A | 8/1998 | Pitcher et al. |
| 5,859,981 | A | 1/1999 | Levin et al. |
| 5,991,308 | A | 11/1999 | Fuhrmann et al. |
| 5,999,530 | A | 12/1999 | LeMaire et al. |
| 6,003,029 | A | 12/1999 | Agrawal et al. |
| 6,029,220 | A | 2/2000 | Iwamura et al. |
| 6,058,385 | A | 5/2000 | Koza et al. |
| 6,101,181 | A | 8/2000 | Passint et al. |
| 6,108,739 | A | 8/2000 | James et al. |
| 6,249,902 | B1 | 6/2001 | Igusa et al. |
| 6,285,679 | B1 * | 9/2001 | Dally ............... H04L 45/00 370/413 |
| 6,314,487 | B1 | 11/2001 | Hahn et al. |
| 6,377,543 | B1 | 4/2002 | Grover et al. |
| 6,415,282 | B1 | 7/2002 | Mukherjea et al. |
| 6,674,720 | B1 | 1/2004 | Passint et al. |
| 6,701,361 | B1 | 3/2004 | Meier |
| 6,711,717 | B2 | 3/2004 | Nystrom et al. |
| 6,778,531 | B1 | 8/2004 | Kodialam et al. |
| 6,925,627 | B1 | 8/2005 | Longway et al. |
| 6,967,926 | B1 | 11/2005 | Williams, Jr. et al. |
| 6,983,461 | B2 | 1/2006 | Hutchison et al. |
| 7,046,633 | B2 | 5/2006 | Carvey |
| 7,065,730 | B2 | 6/2006 | Alpert et al. |
| 7,143,221 | B2 | 11/2006 | Bruce et al. |
| 7,318,214 | B1 | 1/2008 | Prasad et al. |
| 7,379,424 | B1 | 5/2008 | Krueger |
| 7,437,518 | B2 | 10/2008 | Tsien |
| 7,461,236 | B1 | 12/2008 | Wentzlaff |
| 7,509,619 | B1 | 3/2009 | Miller et al. |
| 7,564,865 | B2 | 7/2009 | Radulescu |
| 7,583,602 | B2 | 9/2009 | Bejerano et al. |
| 7,590,959 | B2 | 9/2009 | Tanaka |
| 7,693,064 | B2 | 4/2010 | Thubert et al. |
| 7,701,252 | B1 | 4/2010 | Chow et al. |
| 7,724,735 | B2 | 5/2010 | Locatelli et al. |
| 7,725,859 | B1 | 5/2010 | Lenahan et al. |
| 7,774,783 | B2 | 8/2010 | Toader |
| 7,808,968 | B1 | 10/2010 | Kalmanek, Jr. et al. |
| 7,853,774 | B1 | 12/2010 | Wentzlaff |
| 7,917,885 | B2 | 3/2011 | Becker |
| 7,957,381 | B2 | 6/2011 | Clermidy et al. |
| 7,973,804 | B2 | 7/2011 | Mejdrich et al. |
| 8,018,249 | B2 | 9/2011 | Koch et al. |
| 8,020,163 | B2 | 9/2011 | Nollet et al. |
| 8,020,168 | B2 | 9/2011 | Hoover et al. |
| 8,050,256 | B1 | 11/2011 | Bao et al. |
| 8,059,551 | B2 | 11/2011 | Milliken |
| 8,098,677 | B1 | 1/2012 | Pleshek et al. |
| 8,099,757 | B2 | 1/2012 | Riedle et al. |
| 8,136,071 | B2 | 3/2012 | Solomon |
| 8,203,938 | B2 | 6/2012 | Gibbings |
| 8,228,930 | B1 * | 7/2012 | Kim ............... H04L 49/25 370/413 |
| 8,261,025 | B2 | 9/2012 | Mejdrich et al. |
| 8,281,297 | B2 | 10/2012 | Dasu et al. |
| 8,285,679 | B2 | 10/2012 | Agombar et al. |
| 8,285,912 | B2 | 10/2012 | Feero et al. |
| 8,306,042 | B1 | 11/2012 | Abts |
| 8,312,402 | B1 | 11/2012 | Okhmatovski et al. |
| 8,352,774 | B2 | 1/2013 | Elrabaa |
| 8,407,425 | B2 | 3/2013 | Gueron et al. |
| 8,412,795 | B2 | 4/2013 | Mangano et al. |
| 8,438,578 | B2 | 5/2013 | Hoover et al. |
| 8,448,102 | B2 | 5/2013 | Komachuk et al. |
| 8,490,110 | B2 | 7/2013 | Hoover et al. |
| 8,492,886 | B2 | 7/2013 | Or-Bach et al. |
| 8,503,445 | B2 | 8/2013 | Lo |
| 8,514,889 | B2 | 8/2013 | Jayasimha |
| 8,541,819 | B1 | 9/2013 | Or-Bach et al. |
| 8,543,964 | B2 | 9/2013 | Ge et al. |
| 8,547,972 | B2 * | 10/2013 | Mahdavi ............ G06F 9/455 370/389 |
| 8,572,353 | B1 | 10/2013 | Bratt et al. |
| 8,601,423 | B1 | 12/2013 | Philip et al. |
| 8,614,955 | B2 | 12/2013 | Gintis et al. |
| 8,619,622 | B2 | 12/2013 | Harrand et al. |
| 8,635,577 | B2 | 1/2014 | Kazda et al. |
| 8,661,455 | B2 | 2/2014 | Mejdrich et al. |
| 8,667,439 | B1 | 3/2014 | Kumar et al. |
| 8,704,548 | B1 | 4/2014 | Hutton |
| 8,705,368 | B1 | 4/2014 | Abts et al. |
| 8,711,867 | B2 | 4/2014 | Guo et al. |
| 8,717,875 | B2 | 5/2014 | Bejerano et al. |
| 8,726,295 | B2 | 5/2014 | Hoover et al. |
| 8,738,860 | B1 | 5/2014 | Griffin et al. |
| 8,793,644 | B2 | 7/2014 | Michel et al. |
| 8,798,038 | B2 | 8/2014 | Jayasimha et al. |
| 8,819,611 | B2 | 8/2014 | Philip et al. |
| 8,885,510 | B2 | 11/2014 | Kumar et al. |
| 9,210,048 | B1 | 12/2015 | Marr et al. |
| 9,223,711 | B2 | 12/2015 | Philip et al. |
| 9,244,845 | B2 | 1/2016 | Rowlands et al. |
| 9,244,880 | B2 | 1/2016 | Philip et al. |
| 9,253,085 | B2 | 2/2016 | Kumar et al. |
| 9,294,354 | B2 | 3/2016 | Kumar |
| 9,319,232 | B2 | 4/2016 | Kumar |
| 9,444,702 | B1 | 9/2016 | Raponi et al. |
| 9,471,726 | B2 | 10/2016 | Kumar et al. |
| 9,473,359 | B2 | 10/2016 | Kumar et al. |
| 9,473,388 | B2 | 10/2016 | Kumar et al. |
| 9,473,415 | B2 | 10/2016 | Kumar |
| 9,477,280 | B1 | 10/2016 | Gangwar et al. |
| 9,515,961 | B2 * | 12/2016 | Guo ............... H04L 45/00 |
| 9,529,400 | B1 | 12/2016 | Kumar et al. |
| 9,535,848 | B2 | 1/2017 | Rowlands et al. |
| 9,568,970 | B1 | 2/2017 | Kaushal et al. |
| 9,569,579 | B1 | 2/2017 | Kumar |
| 9,571,341 | B1 | 2/2017 | Kumar et al. |
| 9,571,402 | B2 | 2/2017 | Kumar et al. |
| 9,571,420 | B2 | 2/2017 | Kumar |
| 9,590,813 | B1 | 3/2017 | Kumar et al. |
| 9,660,942 | B2 | 5/2017 | Kumar |
| 9,699,079 | B2 | 7/2017 | Chopra et al. |
| 9,742,630 | B2 | 8/2017 | Philip et al. |
| 10,419,338 | B2 * | 9/2019 | Gray ............... H04L 45/60 |
| 2002/0071392 | A1 | 6/2002 | Grover et al. |
| 2002/0073380 | A1 | 6/2002 | Cooke et al. |
| 2002/0083159 | A1 | 6/2002 | Ward et al. |
| 2002/0095430 | A1 | 7/2002 | Egilsson et al. |
| 2002/0150094 | A1 | 10/2002 | Cheng et al. |
| 2003/0005149 | A1 | 1/2003 | Haas et al. |
| 2003/0088602 | A1 | 5/2003 | Dutta et al. |
| 2003/0145314 | A1 | 7/2003 | Nguyen et al. |
| 2003/0200315 | A1 | 10/2003 | Goldenberg et al. |
| 2004/0006584 | A1 | 1/2004 | Vandeweerd |
| 2004/0019814 | A1 | 1/2004 | Pappalardo et al. |
| 2004/0049565 | A1 | 3/2004 | Keller et al. |
| 2004/0103218 | A1 | 5/2004 | Blumrich et al. |
| 2004/0156376 | A1 | 8/2004 | Nakagawa |

(56) References Cited

U.S. PATENT DOCUMENTS

| | | |
|---|---|---|
| 2004/0156383 A1 | 8/2004 | Nakagawa et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano et al. |
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |

(56) References Cited

U.S. PATENT DOCUMENTS

| | | |
|---|---|---|
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1* | 12/2014 | Philip .............. G06F 1/04 370/503 |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |
| 2018/0159786 A1 | 6/2018 | Rowlands et al. |
| 2018/0183721 A1 | 6/2018 | Rowlands et al. |
| 2018/0191626 A1 | 7/2018 | Rowlands et al. |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.
Das, R., et al., Aergia: Exploiting Packet Latency Slack in On-Chip Networks, 37th International Symposium on Computer Architecture (ISCA '10), Jun. 19-23, 2010, 11 pgs.
Ebrahimi, E., et al., Fairness via Source Throttling: A Configurable and High-Performance Fairness Substrate for Multi-Core Memory Systems, ASPLOS '10, Mar. 13-17, 2010, 12 pgs.
Gindin, R., et al., NoC-Based FPGA: Architecture and Routing, Proceedings of the First International Symposium on Networks-on-Chip (NOCS'07), May 2007, pp. 253-262.
Grot, B., Preemptive Virtual Clock: A Flexible, Efficient, and Cost-Effective QOS Scheme for Networks-on-Chip, Micro '09, Dec. 12-16, 2009, 12 pgs.

(56) References Cited

OTHER PUBLICATIONS

Grot, B., Kilo-NOC: A Heterogeneous Network-on-Chip Architecture for Scalability and Service Guarantees, ISCA 11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B. et al., CoQoS: Coordinating QoS-Aware Shared Resources in NoC-based SoCs, J. Parallel Distrib. Comput., 71 (5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munrul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Sep. 8, 2016, 4 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 6 pages, untranslated, Japan Patent Office.
Office Action received for U.S. Appl. No. 15/829,749, dated Jan. 14, 2019, 14 pages.
Office Action received for U.S. Appl. No. 15/903,425, dated Jan. 22, 2019, 8 pages.
Office Action received for U.S. Appl. No. 15/903,633, dated Feb. 21, 2019, 13 pages.

* cited by examiner

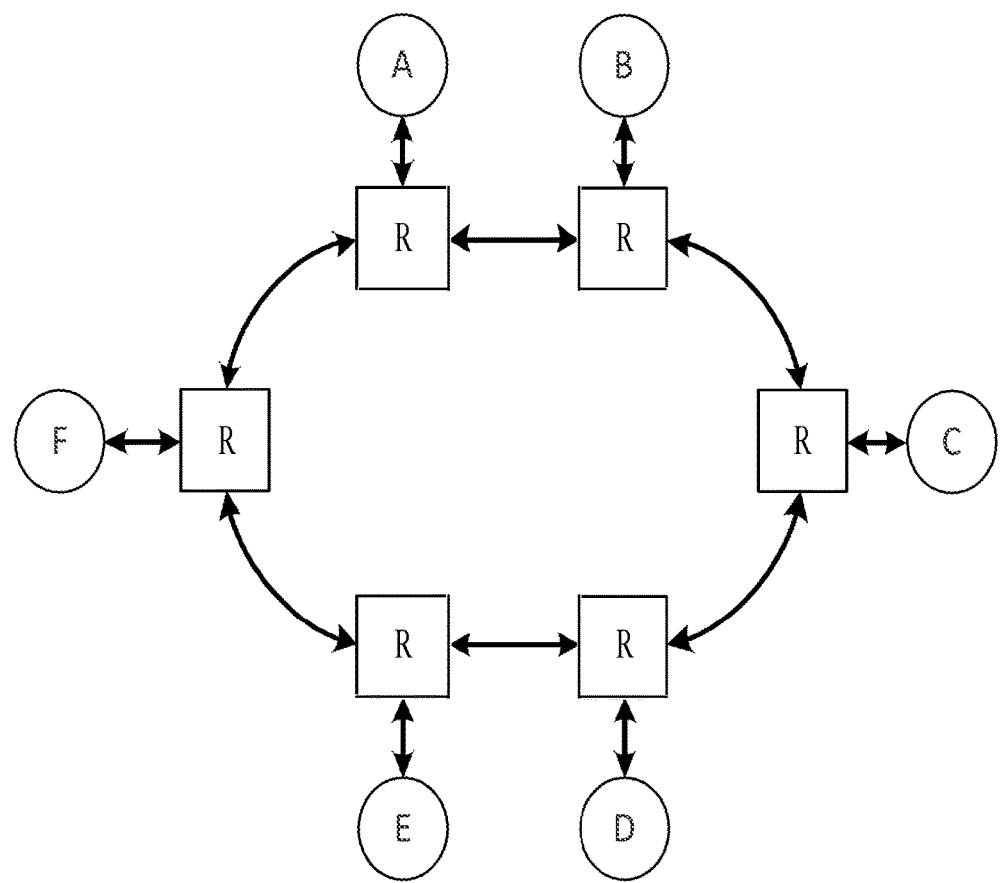
*a Bi-directional ring topology utilizing router(s) {R}*
FIG. I(a)

*2D Mesh topology utilizing router(s) {R}*

*a 2D Taurus topology utilizing router(s){R}*

*a 3D Mesh NoC topology utilizing router(s){R}*

*a two layer NoC interconnect utilizing router(s) {R1 and R2}*

| Target VC | Ready | VC Credit |
|---|---|---|
| VC_Out_1 | Yes | 3 |
| VC_Out_2 | Yes | 1 |
| VC_Out_3 | Yes | 0 |
| ... | ... | ... |

FIG. 8

INTERFACE VIRTUALIZATION AND FAST PATH FOR NETWORK ON CHIP

CROSS-REFERENCE TO RELATED APPLICATION

This regular U.S. patent application is a continuation of U.S. patent application Ser. No. 15/829,749, filed on Dec. 1, 2017 (now abandoned) which is based on and claims the benefit of priority under 35 U.S.C. 119 from provisional U.S. patent application No. 62/429,695, filed on Dec. 2, 2016, the entire disclosures of which are incorporated by reference herein.

BACKGROUND

Technical Field

Methods and example implementations described herein are directed to interconnect architecture, and more specifically, to Network on Chip (NoC) architectures and the design and management thereof.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry route information such as the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

The physical channels are shared into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives, thereby facilitating the sending of the packet to the next router before the packet is fully received. This allows the router to quickly set up the route upon arrival of the head flit and then opt out from the rest of the conversation. Since a message is transmitted flit by flit, the message may occupy several flit buffers along its path at different routers so that the packet can exist in multiple routers, thereby creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

A NoC uses a shared network to pass traffic between different components. Any particular traffic flow might cross multiple routers before arriving at its destination. While the NoC can be efficient in terms of sharing wires, there can be an adverse effect on latency. Each router needs to arbitrate between its various inputs ports to decide which packet will be sent in a cycle. After the arbitration, the data must be selected through a multiplexing (muxing) structure. This process can take one or more cycles to complete, depending on the microarchitecture of the routers and the frequency. This means that for each router a traffic flow must cross, it can be incurring additional cycles of delay. Wire delay between routers can also cause delay.

To reduce latency, the routers can be built with bypass paths that allow skipping some or all of the arbitration and muxing costs of a router. These bypass paths can be used opportunistically when the router is idle, or they can support a simpler arbitration that allows a significant decrease in cycle time loss. Intelligent use of bypasses in a system can improve average latency of requests.

Longer latency can hurt the performance of the system. Reducing the latency of traffic flows is an important goal. The benefit of lower latency vary between different traffic flows. Some components are very latency sensitive, where each additional cycle of latency can have a significant performance reduction. Other flows will be less sensitive to latency. Intelligent setup of the bypasses can select the traffic flows that will provide the largest overall benefit to the system performance.

When packets finish traversing a NoC, they arrive at the interface to a component. Because a NoC can have many different kinds of traffic, design of the interface can have a big impact on performance. Many interface protocols use a method of flow control that doesn't distinguish between the contents of the packets. This can create head-of-line blocking issues, where a more important packet is stuck behind a less important packet.

The destination component can often benefit from distinguishing between different incoming traffic flows, allowing it to accept the more important flows and hold off the less important flows when resources are scares. Support of an enhanced interface can allow the destination component to signal the network which traffic flows it is willing to accept. The network can then choose which packets to send, avoiding the head-of-line blocking issue.

The enhanced interface flow control can be coupled with the networks use of virtual or physical channels to further avoid head-of-line blocking. If lower priority packets are transported in a separate channel from the higher priority packets, the destination component can backpressure one channel and allow the other to continue unimpeded.

SUMMARY

Therefore, to address the aforementioned problems, there is a need for systems, methods, and non-transitory computer readable mediums to facilitate an opportunistic bypass system for a NoC, as well as a VC valid and credit system to facilitate the management of VCs of the NoC.

Aspects of the present disclosure involve a Network on Chip (NoC) having a plurality of channels and a valid-ready system with VC valid and VC credit going back, element configured to send a valid signal with a VC valid signal.

Aspects of the present disclosure further involve a network on chip (NoC) element involving a plurality of physical links and virtual links, and a configurable bypass between virtual links, and bypass logic configured to bypass the queue and the logic of the NoC element.

The bypass is configured to bypass the queue and the logic of the NoC element in an opportunistic manner in accordance with the desired implementation. The NoC can also involve a configurable router that has complete configurability in terms of which bypasses are available. The configurable router has output ports, in which any select input port can connect to an output port with a direct bypass.

Aspects of the present disclosure can further include methods and computer readable mediums directed to determining the selection of bypasses for NoC construction. Such methods and computer readable mediums can include algorithms that during NoC construction, create additional opportunities for bypassing. Such algorithms can include restrictions to bypass placement (e.g., connections requiring upsizing and downsizing do not have bypass) reshaping the NoC topology to create more links for the bypass, building the NoC to have equal number of ports with no clock crossing, and avoiding upsizing and downsizing links.

In example implementations, the algorithms for the creation of bypass paths can involve determining the possible bypass opportunities for the configurations based on restrictions, for each bypass opportunity, choosing which inputs go to the output based on calculation of expected traffic flows/bandwidth that are expected to have biggest impact on the specification (e.g., weighted average of traffic, also take latency and importance of traffic into consideration), and selecting the bypasses with the biggest benefit.

In example implementations, there can be algorithms such as a multiplexer selection algorithm to select which multiplexer to use (e.g., preselected versus post selected), opportunistic bypass processing (e.g., messages are sent through bypass if bypass is idle or if bypass is possible, bypass conducted based on latency and First In First Out (FIFO) depth).

In example implementations, there can be NoC elements and configuration methods wherein a single input port could be selected for use as a bypass to multiple output port subject to restrictions (e.g., output VC must be the same size as the input, different physical link sizes involve bypass links with matching VCs).

BRIEF DESCRIPTION OF THE DRAWINGS

FIGS. 1(a), 1(b), 1(c) and 1(d) illustrate examples of Bidirectional ring, 2D Mesh, 2D Taurus, and 3D Mesh NoC Topologies.

FIG. 8 illustrates an example table view of information utilized by the NoC element, in accordance with an example implementation.

DETAILED DESCRIPTION

Figure 1B:
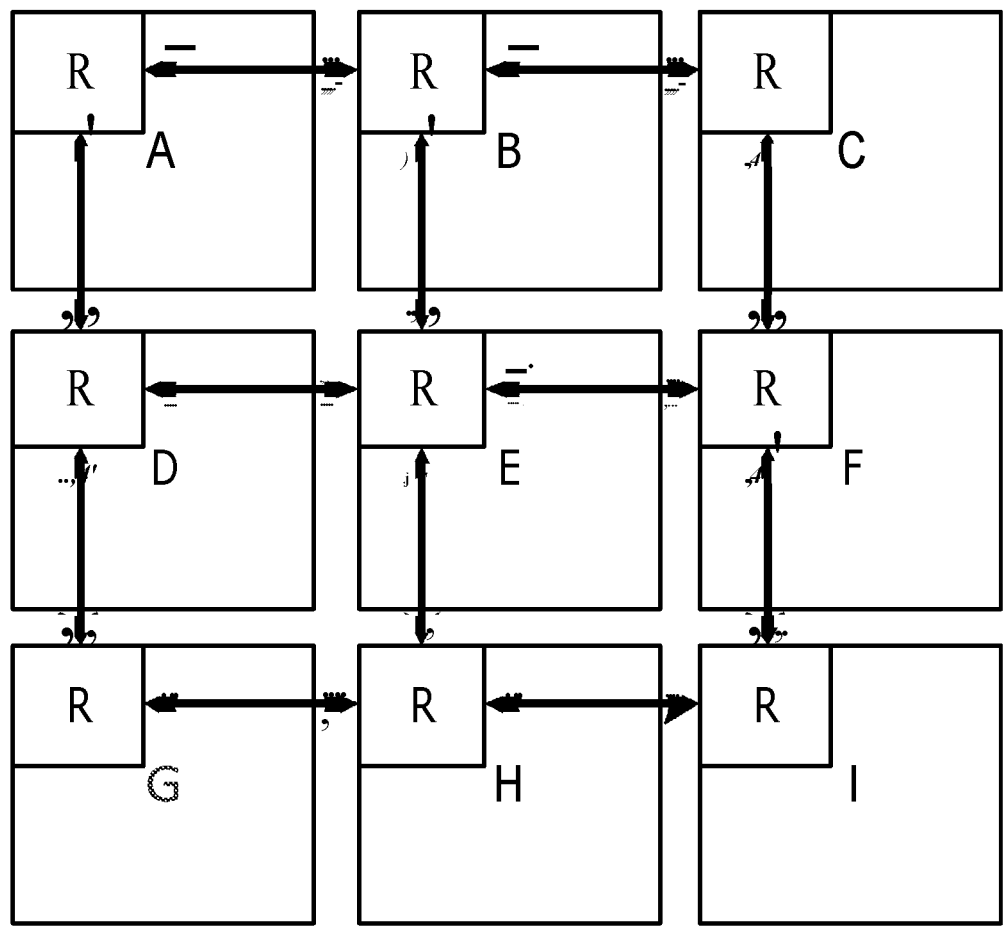
Figure 1C:
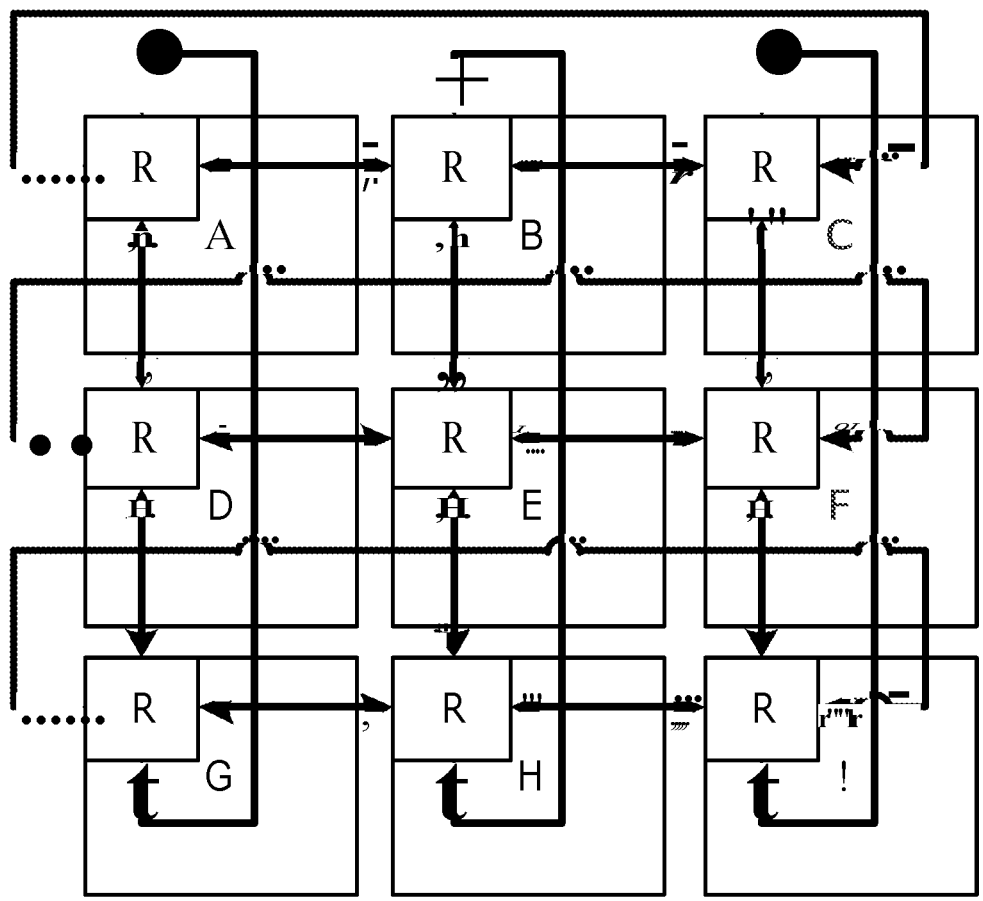
Figure 1D:
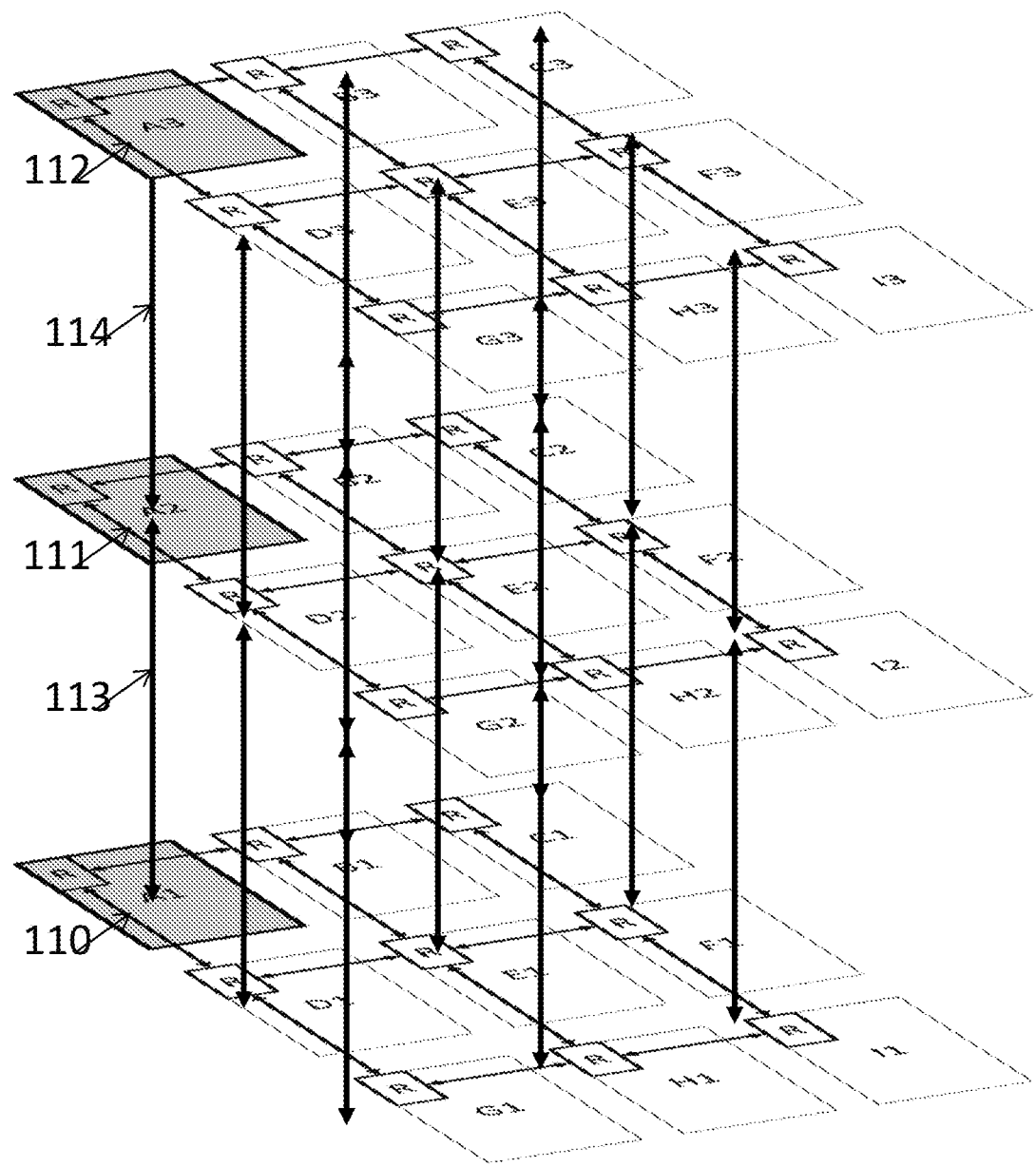
Figure 2A:
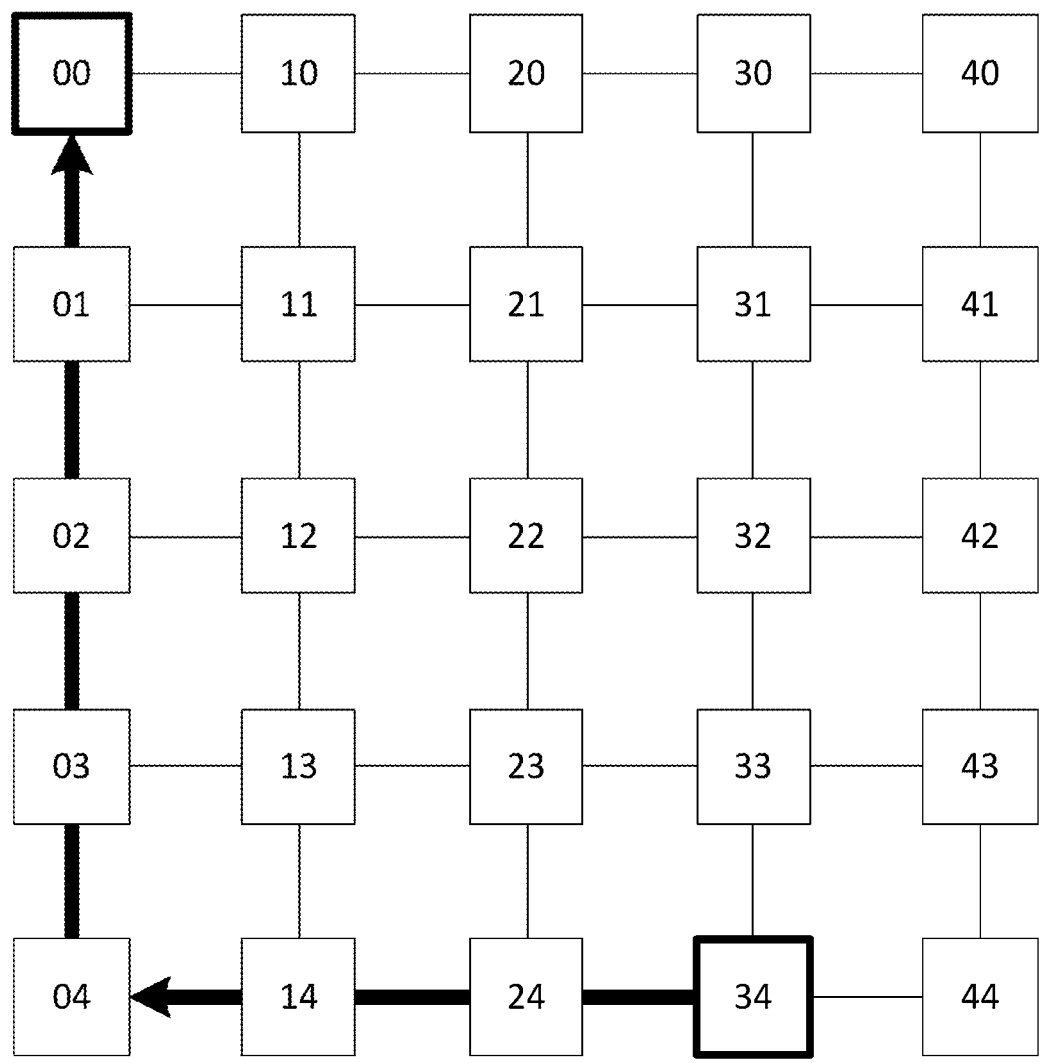
FIG. 2(a) illustrates an example of XY routing in a related art two dimensional mesh.
Figure 2B:
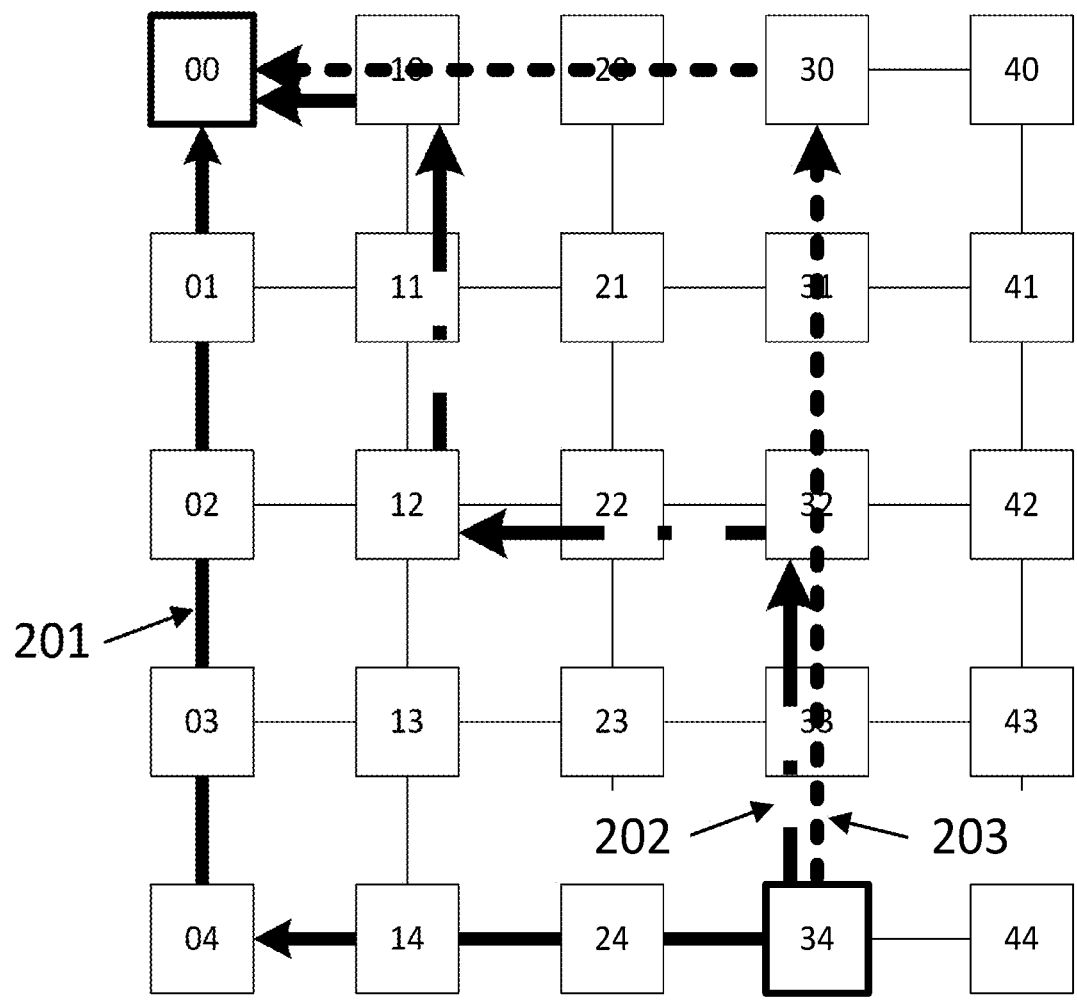
FIG. 2(b) illustrates three different routes between a source and destination nodes.
Figure 3A:
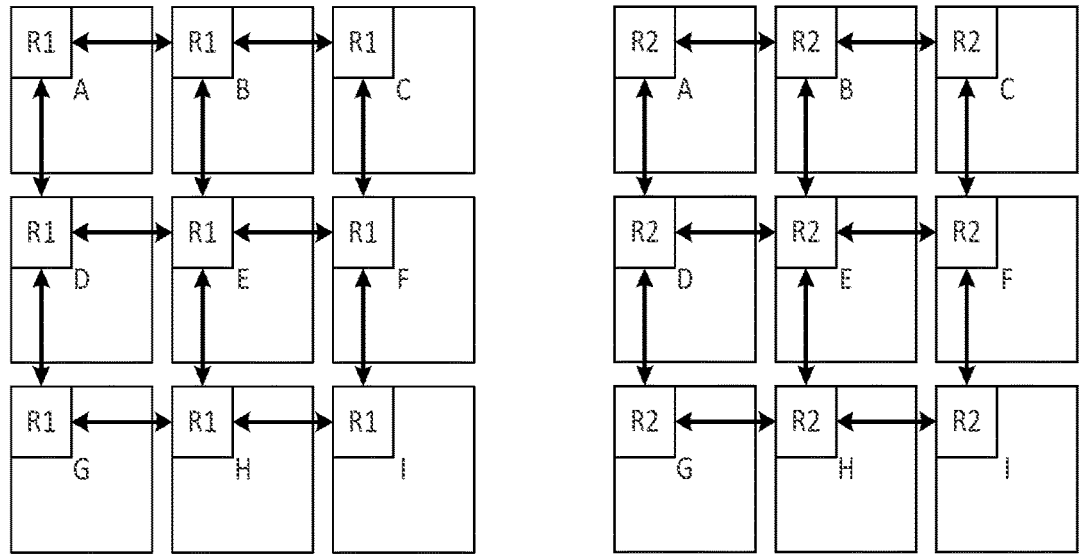
FIG. 3(a) illustrates an example of a related art two layer NoC interconnect.
Figure 3B:
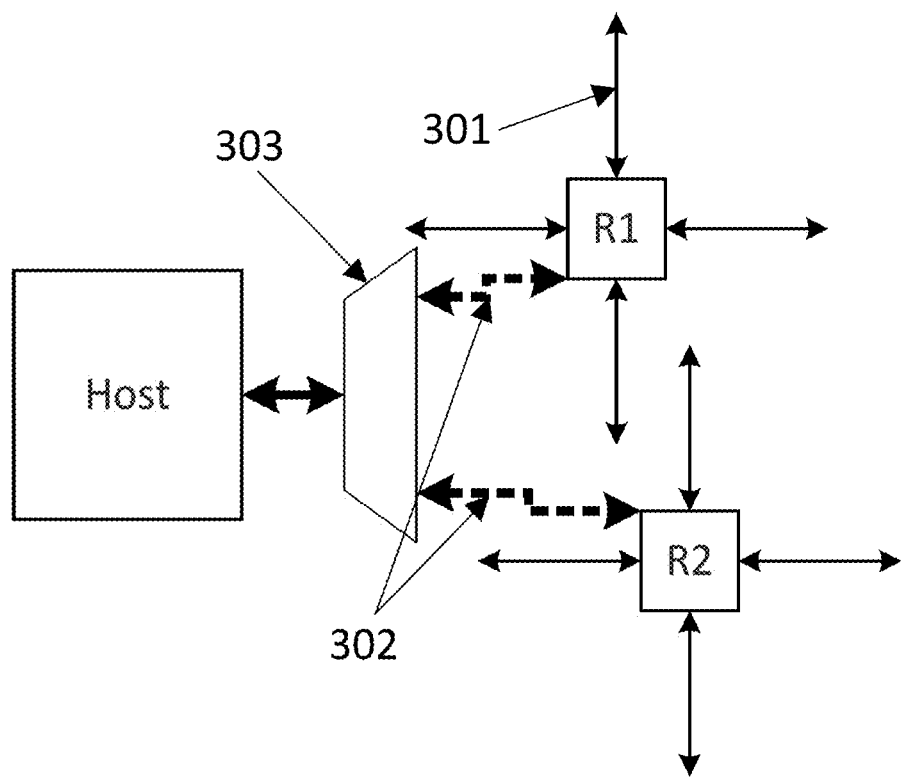
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation.

In a NoC, there is a network having routers and bridges. Other elements may also be present which can make the NoC fairly large. There may be an inherent latency problem with the NoC. In example implementations, bridges require activation for send messages into the network, and when messages are sent through the link, the router has to arbitrate the messages before the message is sent to the next hop.

For each hop running at a slow frequency, an entire router arbitration calculation including the travel time can be determined. However, most related art implementations are executed at a high frequency, wherein in such cases that the router arbitration may be conducted in a single cycle. Further, latency can be incurred in the bridge, with a cycle incurred in the bridge, a cycle for the link, a cycle for the router, and so on for the transaction. Latency reduction can be difficult due to the routers having arbitration requirements which incur a latency loss for arbitration in each router.

Figure 4:
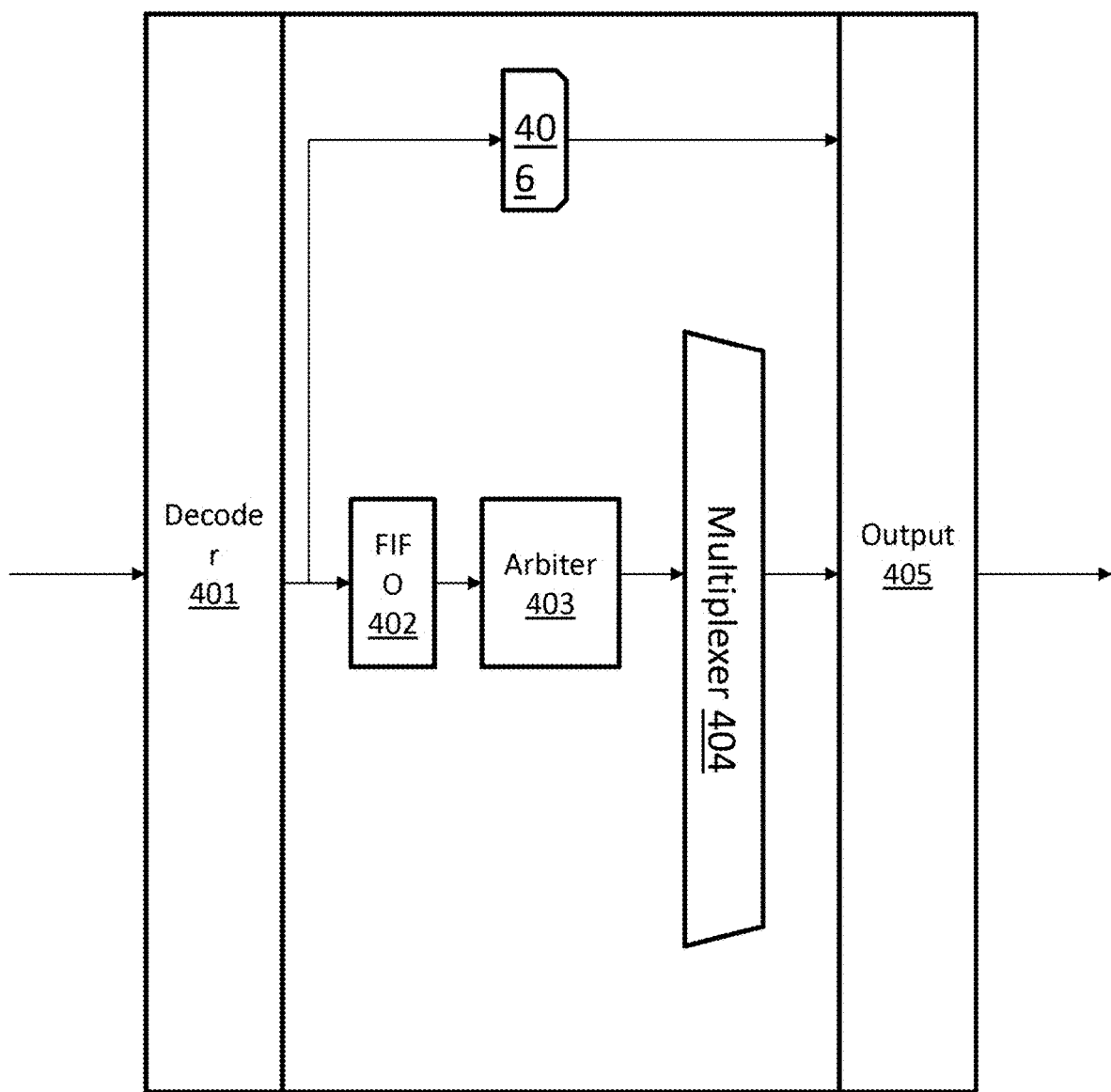
FIG. 4 illustrates an example of a router, in accordance with an example implementation.

FIG. 4 illustrates an example of a router, in accordance with an example implementation. In example implementations for reducing latency in the router, routers implement a fast path, which functions as a bypass having bypass logic 406. A router may have an assortment of inputs which are processed by elements such as a decoder 401, a queue such as a First in First Out (FIFO) queue 402, an arbiter 403 and a multiplexer 404 (mux) for conducting arbitration and determining the output 405. In example implementations alongside the multiplexer 404, the router has a path configured to function as a special bypass with bypass logic 406. One or more inputs can be designated for the special bypass, such that the input entering one of the muxes will be able to hop in at the end of a cycle. If there is an output, the output can be placed in at the end of a cycle so that the input into the router will be able to go directly to the output instead of going through the arbitration. In such an example implementation, one cycle of latency can thereby be removed per router by reducing the processing to decode, bypass logic (e.g. validation) and output. Routing information can be included in direct wires to the router in accordance with the desired implementation. Further, once latency is reduced, the potential round trip latency is decreased as other messages may be able to pop off the FIFO more quickly. Once the bypasses are configured for each eligible router, the example implementations could then calculate the cycle of depth based on this latency. Example implementations of a NoC contains hardware or NoC elements that involve a plurality of physical links and virtual links, with a configurable bypass between virtual links, and bypass logic 406 configured to bypass the queue and the logic of the NoC element. The bypass logic 406 can be configured to initiate bypass of the message in an opportunistic manner (e.g., depending on whether queue is free or not, etc.)

In example implementations, messages destined to bypass can be pre-arbitrated and then the only logic in the hop can be for determining which output channel is used for the bypass as determined by the bypass logic as illustrated in FIG. 4. In example implementations, multiple outputs can be used for bypass for an input. For example, one input can bypass to one of multiple output ports, with each output associated with only one input. Bypass logic may also be utilized for optimizing messages in accordance with an example implementation. For example, if a queue is empty the message is sent through the logic for the bypass. If no other message takes priority then the message is transmitted through the bypass path to avoid all logic. Such example implementations can therefore be configured to conduct more than simply bypassing the FIFO queue and entering arbitration, but can be utilized to bypass all router logic and go directly to the output. In example implementations, the bypass can be conducted when there is no other traffic going on the link, which indicates no cost to arbitration as determined by the bypass logic.

In the following example implementations, requirements may be set for forwarding an input to the special bypass. One example requirement is that the link sizes are matched so latency from a width conversion is removed. Another example requirement is no clock crossing, so latency from clock conversion is also removed. Other requirements may also be set in according to the desired implementation.

Related art implementations implement a bypass path in a fixed position that is affixed to an input that is considered to be the most common bypass user. One example of a related art implementation is that an input destined for a particular direction will continually proceed in the direction (e.g. a south input port bypasses to the north input port). Such related art solutions are static.

In example implementations as illustrated in FIG. 4, there can be a NoC hardware element which can involve a plurality of physical channels and virtual channels, and a configurable bypass between virtual links, whereupon bypass logic can be configured to bypass the queue and the logic of the NoC element in an opportunistic manner. The bypass logic can allow messages to be transmitted through the bypass opportunistically based on whether the input First in First Out (FIFO) queue is empty or not, based on the priority of the traffic being arbitrated, whether the bypass is idle/available or not, queue depth of the transmitting hardware element, and so on depending on the desired implementation.

Figure 5:
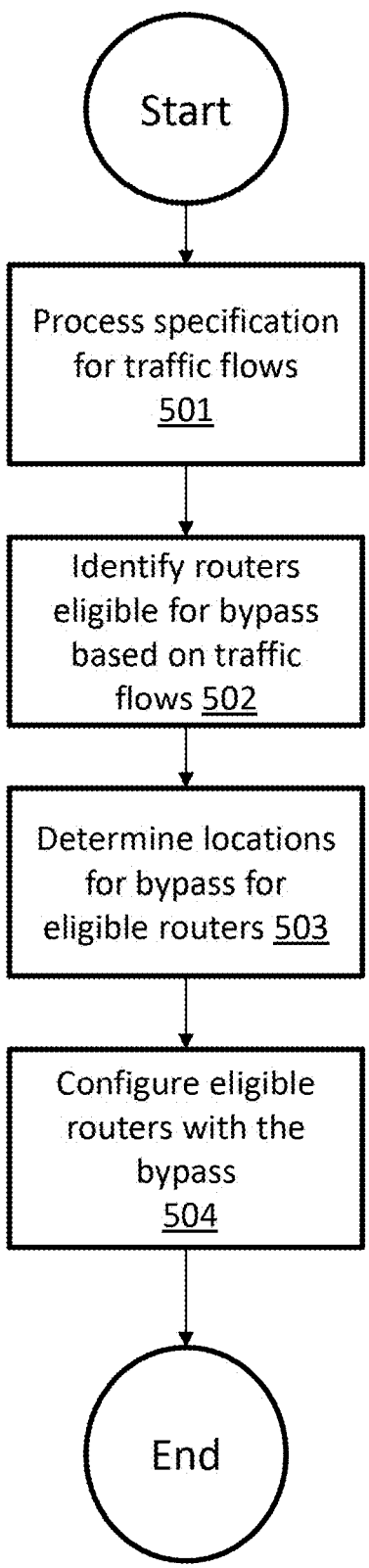
FIG. 5 illustrates an example flow diagram for configuring routers during configuration time, in accordance with an example implementation.

In example implementations, the bypass configuration can be made during configuration time for the specification. FIG. 5 illustrates an example flow diagram for configuring routers during configuration time, in accordance with an example implementation. At 501, the specification is processed for traffic flows. During configuration time, the example implementations determine all of the traffic flows from the specification, wherein routers that are eligible for bypass are identified at 502. In an example implementation, if all the traffic flows can be considered during configuration time, traffic tendencies can be identified for a router (e.g. most traffic for an identified router proceeds from the west port to the north port). In the above example, a bypass can be constructed from the west port to the north port to reduce latency. Other implementations based on the traffic flow for identifying routers are also possible depending on the desired implementation. For example, latency sensitivity of traffic flows can also be recognized. In this manner, example implementations can be configured to determine the bypass not only by the most amount of traffic going through a port, the bypass can be determined based on determining the importance of the traffic. Traffic flows can be associated with a weight in terms of the importance of the latency, e.g. how latency sensitive is the traffic, which can be taken into account for identifying eligible routers. Example implementations can calculate the latency sensitivity based on the weights. For example, latency sensitive traffic can be multiplied by the weight to prioritize latency sensitive traffic over raw latency for a channel, depending on the desired implementation.

Example implementations can also analyze traffic flows so that an array is created based on the input ports (e.g. A, B, C, D, E, and F), and analyze how much of the traffic is coming in on a given link is going to a given output port. So for a given output port, analysis can be conducted by comparing the input ports and constructing a bypass based on the bandwidth consumed by the input ports to a given output port. For example, for a router wherein input port one is responsible for three gigabytes of output for output port X for a given time frame and input port two is responsible for six gigabytes for the given time frame, a bypass can be utilized between input port two and output port one.

At 503, locations for implementing a bypass are identified. The locations for implementing the bypass can be identified based on the traffic flow determinations, the hardware configuration of the router and by other methods according to the desired implementation. For example, simulations can be conducted to detect where latency as affected by wire length and travel length are taken into consideration. In such example implementations, output ports can be configured so that a bypass can be made available within the router. And so by converting the router with additional output ports, latency can be reduced. Thus, in example implementations, the optimization can involve determining which bypasses can be implemented to reduce latency and the location of such bypass. The optimization can involve a pre-optimization implementation where conditions for bypassing are identified, and bypasses can be implemented therein. By using design tools during the configuration time, path input algorithms can be utilized to determine the shortest path for the bypass for use in determining the location for implementing the bypass. Optimizations for placement of network elements can also be made to create additional opportunities for bypass in accordance with the desired implementation.

Bypasses may also be determined based on desired constraints. In an example constraint, the input VC width is set to match the output VC width. In such an example implementation, the physical link size may be different, however, the bypass is still utilized between the two physical links to connect matching input and output VCs.

At 504, the eligible routers are then configured with the bypass based on the determinations. As the routers are configurable in example implementations, a heterogeneous NoC with heterogeneous routers can thereby be implemented. Example implementations are in contrast to related art systems, which are directed to homogenous NoC systems and homogenous routers. Related art implementations involve bypasses that are stacked directionally on the assumption that the NoC is homogenous and is therefore static, whereas the example implementations of the present disclosure can utilize heterogeneous router and NoC configurations.

Example implementations described herein can be implemented as a hardwired bypass. In such example implementations, the software at configuration time can precompute where packets are going and can also utilize sideband information to the NoC. Sideband channels can be utilized for messages to determine which output port to utilize. Sideband information does not need to be utilized for controlling multiplexing to the output ports, but can be utilized control the validity of the output port. The routing information is processed, wherein example implementations calculate the route including the port.

As illustrated in FIG. 5, example implementations can also involve methods and computer readable mediums with instructions directed to determining the selection of bypasses for NoC construction. Such example implementations can involve algorithms that during NoC construction, create additional opportunities for bypassing. The opportunities can involve the reshaping of NoC topology to create more channels that are eligible for bypass (e.g., building a NoC with routers having equal numbers of ports without any clock crossing), applying restrictions to bypass to avoid channels or virtual channels that conduct upsizing and downsizing, and so on depending on the desired implementation.

Example implementations can also involve algorithms for the creation of bypass paths. As illustrated in FIG. 5, such algorithms determine all of the possible bypass opportunities for the configurations based on the restrictions as described above. For each possible bypass, the algorithm can then determine which inputs go to which output based on the calculation of expected traffic flows/bandwidth. Such example implementations will determine which bypass provides the biggest impact on the NoC specification (weighted average of traffic, also take latency and importance of traffic into consideration), whereupon the algorithm can thereby choose bypasses with the biggest benefit above a desired threshold.

Example implementations may also involve algorithms for selecting which multiplexer to incorporate into the NoC hardware element, which can be conducted in a preselected manner or configured after the NoC is designed, in accordance with the desired implementation.

Example implementations may also involve NoCs with hardware elements having differing physical channel sizes, but VCs with matching sizes to facilitate the bypass. The hardware elements may also be in the form of a configurable router that has complete configurability in terms of which bypasses are available. In an example implementation, the router design can involve having each output port associated with a selected input port with a direct bypass. Further, example implementations may involve a NoC element and configuration method wherein a single input port could be selected from bypass to multiple with restrictions. (e.g., if the output VC is the same size as the input.)

Virtualization Interface and Valid-Ready for virtual channels (VCs) and other types of traffic In related art implementations, NoC systems utilize a valid/ready handshake. In such a handshake protocol, one NoC element asserts a valid signal, and if the receiving NoC element asserts a ready signal at the same time, then a message transfer can occur between the two NoC elements. Such related art implementations may further have restrictions depending on the implementation (e.g. to prevent deadlock). In an example restriction, the NoC element does not wait for the valid signal to assert a ready signal, or vice versa. However, related art implementations of the valid/ready handshake are not aware of the actual status of VCs. In related art implementations, even if a request is made using the valid/ready handshake, the status of the VC to be used may actually be blocked. Further, other VCs within the physical channel may be available, but the related art implementations cannot discern their availability due to the NoC elements requiring a ready signal before proceeding. Such implementations may also apply to other traffic types where the valid/ready handshake is blocking the transmission. The destination element would benefit from being able to indicate which traffic flows it would like to receive through the issuance of credits or indication through the ready signal for that specific traffic type.

In example implementations, additional information is provided for a valid-ready handshake to address the issues with the related art. Example implementations utilize a valid-ready and credit based hybrid system to facilitate valid-ready handshake functionality. In a credit-based design for the example implementations, independent credits are allocated for each VC. The requesting NoC element transmits a request when a VC credit has been obtained.

Related art implementations utilize a sideband information channel to indicate which virtual channels are available. However, such information is potentially stale. Further, such implementations provide a bit vector that indicates VCs within a range are available (e.g. VCs 8-16) without specifically indicating which VCs are available and which are not.

Figure 6:
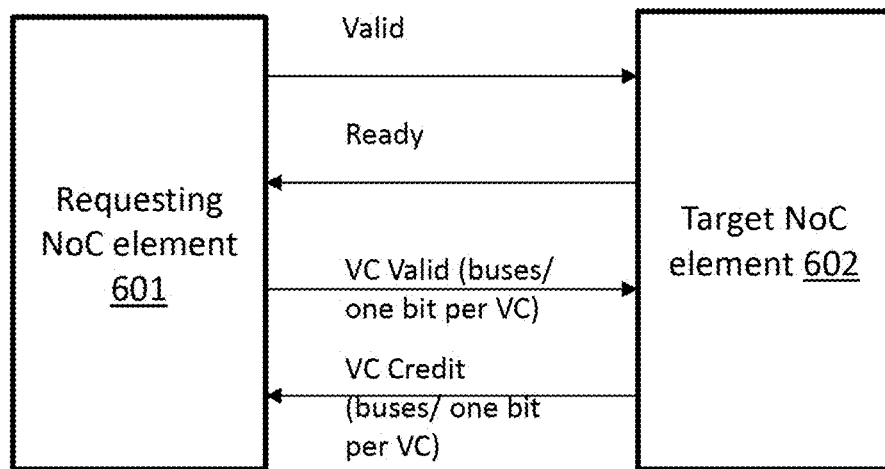
FIG. 6 illustrates a valid-ready architecture in accordance with an example implementation.

FIG. 6 illustrates a valid-ready architecture in accordance with an example implementation. In example implementations, a hybrid approach involving a credit base system is utilized, which facilitates a bi-directional communication. For a NoC requesting element 601 and a NoC target element 602, there is a valid-ready handshake as well as another vector for VC valid and VC credit in the sideband. The VC valid information is provided to the NoC requesting element 601, so that the NoC requesting elements makes the request if a specific resource dedicated to the request is available. Such example implementations provide flexibility as the number of virtual channels can be any number in accordance with a desired implementation.

In example implementations, a number of VCs on the NoC are associated with a physical interface. The physical interface can be associated with a number of interface VCs which can be mapped according to the desired implementation.

In an example implementation involving a master and slave, a NoC bridge is utilized. The NoC bridge communicates with a slave, which may have a plurality of virtual channels for the traffic. One virtual channel may involve high-priority CPU traffic (e.g. latency-sensitive traffic), another may involve I/O traffic, and another may involve asynchronous traffic which may be time critical, and so on. The properties of the virtual channels may also change over time, depending on the desired implementation.

In example implementations involving credit based implementation, as each channel can be separated and dedicated to the desired implementation, such implementations avoid the merger of traffic flows that should not be merged.

In the example implementation hybrid approach, the credit-based handshake is conducted between the agents while valid-ready requirements are enforced. In an example implementation, the target sends a credit back to the master indicating that a resource is available for a request. When the master tries to make that request, the target can indicate that it is not ready due to some delay (e.g. clock crossing). By utilizing the valid-ready with the credit system, it provides a way for temporary back-pressuring from the slave.

In example implementations, initialization is also facilitated as when the credit-based approach is applied, the NoC elements will determine the initialization. For example, the initialization of the credits can be zero, whereupon after a reset credits can be passed from the target NoC element to the requesting NoC element. Depending on the desired implementation, a certain number of credits can be provided at the master. However, if the reset for the NoC elements are unknown, the flow is harder to control, the valid-ready handshake can be utilized with the ready allowed for de-assertion. Even though the master element has VC credits, the master may be unable to transmit until the target NoC (slave) element is ready to accept the credits.

In example implementations, different virtual channels may involve different responses (e.g. read response, write response). In example implementations, there can be multiple virtual channels on the read interface going into another controller having only one read response channel. Thus, the congestion may go to the memory controller undergoing different arbitrations with a guaranteed drain. Each channel is completely independent, and they can be used for any purpose according to the desired implementation.

Example implementations involve a bookkeeping mechanism to track responses. Such a mechanism can involve a data structure to store information to track responses and when the responses are received. For example, if there are four VCs, the VCs can be broken into four segments with reservations. The arbiter may determine to send a flit if the NoC element has credit at the output. The example implementations can involve any partition of the data structure between the four VCs in any way according to the desired implementation. For example, each hardware element can be dedicated to a single VC, or pools of resources can be shared with some or all of the VCs. In example implementations, a mix of dedicated and shared resources can also be provided. Dedicated resources can ensure one channel cannot block another channel.

FIG. 7(*a*) illustrates an example system having a SoC element (master) 701, a SoC element (slave) 705, NoC bridges 702, 704 and a NoC 703, in accordance with an example implementation. In the example implementation, the NoC bridges 702, 704 and the NoC elements inside the NoC 703 have four input VCs and four output VCs. A single physical wire proceeds from the SoC element to the bridge, whereupon the signal is fanned out to each NoC element in four output VCs.

Figure 7A:
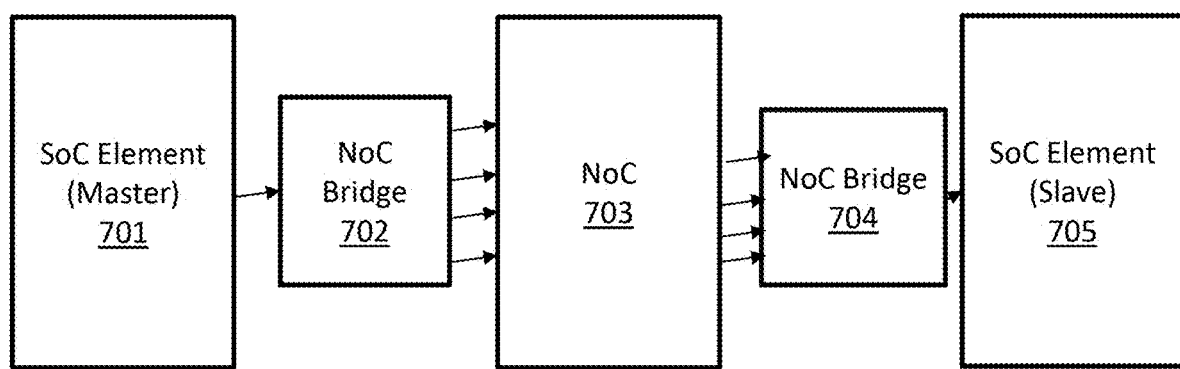
FIG. 7(a) illustrates an example system having a SoC element (master), a SoC element (slave), a NoC bridge and a NoC, in accordance with an example implementation. In the example implementation, the NoC bridges and the NoC elements have four input VCs and four output VCs. A single physical wire proceeds from the SoC element to the bridge, whereupon the signal is fanned out to each NoC element in four output VCs.
Figure 7B:
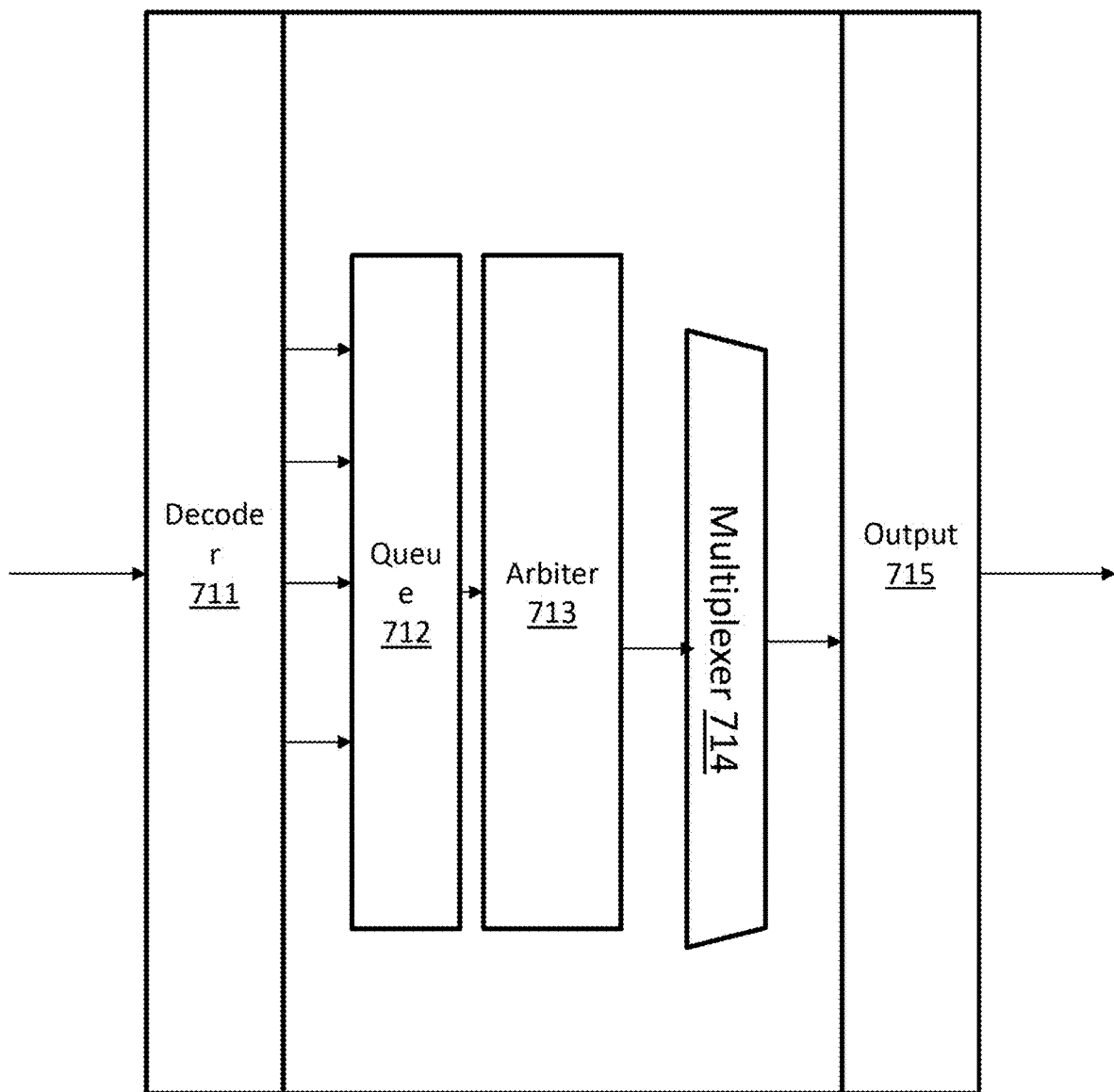
FIG. 7(b) illustrates an example architecture for a NoC element, in accordance with an example implementation.

FIG. 7(b) illustrates an example architecture for a NoC element, in accordance with an example implementation. In the example implementation, the NoC element has four input VCs and four output VCs. In the example of FIG. 7(b), there is a decoder 711 for the input VCs, a queue 712, an arbiter 713, a multiplexer 714, and an output 715 facilitating output to four output VCs. The single bus feeds into the decoder 711, which receives the input and fans out the input to four individual queues 712. When a VC credit is received, the arbiter 713 pops a flit off of the queue 712 and send the flit to the multiplexer 714 to be transmitted through the corresponding output VC 715.

As illustrated in FIGS. 7(a) and 7(b), example implementations may involve a NoC that can involve a plurality of channels (e.g., physical channels, virtual channels and/or virtual channels disposed within the physical channels) and NoC hardware elements. Such NoC hardware elements can involve at least one receiving hardware element (e.g., target NoC element 602) and at least one transmitting hardware element (e.g., requesting NoC element 601) as illustrated in FIG. 6. When a transmitting hardware element is to transmit a message, the protocol as illustrated in FIG. 6 can be followed wherein the hardware element transmits a valid signal to the at least one receiving hardware element on a channel of the plurality of channels, and transmits a virtual channel (VC) valid signal on a virtual channel of the plurality of channels to the at least one receiving hardware element. The receiving hardware element is configured to transmit a VC credit to the at least one transmitting hardware element over the virtual channel of the plurality of channels as illustrated in FIG. 6.

Depending on the desired implementation, the transmitting hardware element can be configured to not transmit the VC valid signal on the virtual channel until a VC credit is obtained, and transmit the VC valid signal on the virtual channel to the at least one receiving hardware element on receipt of the VC credit based on the protocol of FIG. 6. In example implementations, the transmitting hardware element can issue a write request when the transmitter determines that the receiving NoC hardware element has enough buffer size for the address information and the storage of data. The transmitting NoC hardware element can infer such information based on the default storage (e.g., 64B) which can be programmable or definable depending on the desired implementation.

In an example implementation, the plurality of channels can also involve virtual channels, with each of the physical channels being configurable to be independently controlled to adjust a number of VCs for each of the plurality of channels. Such implementations can be conducted by a NoC controller which is configured to define the number of VCs for a given physical channel. In an example implementation, the NoC may maintain the same quantity of VCs for read messages as for read response messages within a given physical channel through such a NoC controller, or they can be differing quantities depending on the desired implementation.

In example implementations, the NoC may include a configurable interface for the transmitting hardware element and the receiving hardware element, that configures the transmitting hardware element and the receiving hardware element for at least one of deadlock avoidance and quantity of virtual channels. Such configuration can be conducted through a NoC specification, wherein the interface can be in the form of a hardware/software interface or a hardware mechanism that processes the specification to configure the NoC for deadlock avoidance, and quantity of virtual channels.

In example implementations, the NoC may also include a virtual interface for virtual channels to interact with agents of a SoC. Such a virtual interface can be implemented in the NoC bridges, or can be part of the NoC depending on the desired implementation.

In example implementations, the transmitting element can be configured to manage VC credits received from one or more receiving hardware elements as illustrated in FIG. 8, and conduct arbitration based on whether a message destination is associated with a VC credit from the managed VC credits. The hardware elements can be configured to conduct informed arbitration, as each hardware element knows whether a potential output VC has an associated credit or not based on the information managed as illustrated in FIG. 8.

In further example implementations, the receiving hardware element can be configured to provide a reservation for a VC to one or more transmitting hardware elements based on at least one of management of dedicated VC credits to the one or more of transmitting hardware elements, a shared tool providing certain minimum priority for the one or more transmitting hardware elements, and an inference of priority from the one or more of the at least one transmitting hardware element. Such reservations can include a pre-configuration so that certain hardware elements always have a certain number of VC credits reserved, priority inferred based on the type of message received or a hierarchy of hardware elements as defined in the NoC specification.

FIG. 8 illustrates an example table view of information utilized by the NoC element, in accordance with an example implementation. In example implementations, NoC elements may include a bookkeeping mechanism to indicate the status of the target VCs. In the example of FIG. 8, each output VC is associated with a ready signal, and VC credit. When ready and valid are set, then a transfer can take place. VC credit indicates the number of credits available for transmission to the output VC. VC credit is incremented when a credit signal is received, and decremented when a credit is utilized.

Figure 9:
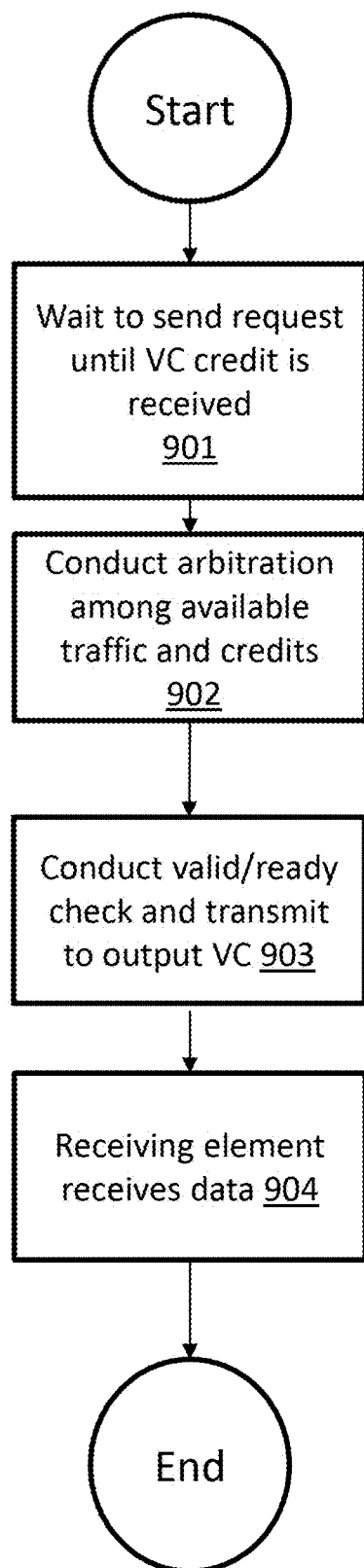
FIG. 9 illustrates a flow diagram for a requesting NoC element, in accordance with an example implementation.

FIG. 9 illustrates a flow diagram for a requesting NoC element, in accordance with an example implementation. At 901 the requesting NoC element waits until a VC credit is received before transmitting a request. At 902, once a VC credit is received, the requesting NoC element conducts arbitration among available traffic that are associated with credits, and forwards the data packet to the output interface. At 903, the valid/ready handshake as illustrated in FIG. 6 is conducted, wherein a VC valid signal is provided to indicate the VC that the data will be sent through and the data/flit is sent through the corresponding VC with the VC valid signal. The VC credit counter is decremented. The requesting NoC element will also wait for additional VC credits as necessary. At 904, the receiving element receives the data/flit from the transmitting element.

In example implementations there can be a system such as a NoC, a SoC, or any hardware element system that require a virtual channel interface that involves a plurality of channels; at least one receiving hardware element; and at least one transmitting hardware element configured to: transmit a valid signal to the at least one receiving hardware element on a channel of the plurality of channels, and transmit a virtual channel (VC) valid signal as a virtual channel indicator for a virtual channel of a plurality of virtual channels designated for transmission of data and transmit the data on the virtual channel designated for the transmission of the data; wherein the at least one receiving hardware element is configured to transmit a VC credit to the at least one transmitting hardware element as illustrated in FIG. 6 and FIG. 9.

In example implementations, the at least one transmitting hardware element is configured to not transmit the data packet on the virtual channel until a VC credit is obtained. The plurality of channels can be physical channels that are partitioned into one or more virtual channels, and each of the channels can be configurable to be independently controlled for mapping to an interface virtual VCs. In such example implementations, multiple transmitting channels can map to a single interface virtual channel, or a single transmitting channel can map to multiple virtual channels depending on the desired implementation. In an example implementation involving a single transmitting channel mapping to multiple virtual channels, the transmission can be conducted when any of the VC credits are available. The mapping can be done through a virtual interface connected to the NoC to map virtual channels with transmitting elements such as agents of a SoC. Such interfaces can include read channels, read response channels, and so on depending on the desired implementation. In example implementations, the interface can include the decoder, queue, arbiter, multiplexer, and/or the output as illustrated in FIG. 7(*b*).

In example implementations, the at least one transmitting element is further configured to manage VC credits received from one or more of the at least one receiving hardware element; and conduct arbitration based on whether a message destination is associated with a VC credit from the managed VC credits as illustrated in FIG. 8. The management can be done through the interface of the hardware element that is configured to map transmitting channels to virtual channels.

In example implementations, the at least one transmitting hardware element is configured to arbitrate messages for transmitting through prioritizing messages that are associated with a VC credit through the user of the arbiter as illustrated in FIG. 7(*b*).

In example implementations, the at least one receiving hardware element is configured to provide a reservation for a VC to one or more of the at least one transmitting hardware element based on at least one of management of dedicated VC credits to the one or more of the at least one transmitting hardware element, and an inference of priority from the one or more of the at least one transmitting hardware element based on the information of FIG. 8. Priority can be inferred based on the type of message and the hierarchy set according to the desired implementation (e.g., hierarchy for read, read response, write, etc.).

In example implementations the at least one receiving hardware element can be a NoC element such as a router or a bridge and the at least one transmitting hardware element is an agent of the System on Chip (SoC), such as a memory or a CPU.

Although example implementations involve a NoC, other systems such as a SoC or other interconnect can be utilized in accordance with the desired implementation. Any hardware element that can utilize a virtual interface can take advantage of the example implementations described herein.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A hardware element incorporated into a Network on Chip (NoC), the hardware element comprising:
    a plurality of physical links and a plurality of virtual links;
    a queue to transmit output messages to output ports of the hardware element;
    an arbiter configured to process input messages from input ports to the queue based on a logic scheme;
    bypass logic configured to redirect the input messages to a configurable bypass link, the configurable bypass link being coupled between the plurality of virtual links, to bypass the queue and the arbiter; and
    a plurality of configurable bypass links to bypass the queue and the arbiter, the plurality of configurable bypass links to provide a pathway from the bypass logic to the output ports through the plurality of physical links, wherein a configurable router of the NoC is to provide configurability of which bypass link from the plurality of configurable bypass links is available to bypass the queue and the arbiter, wherein the configurable router is to couple any input port to an output port with a direct bypass, wherein bridge logic, coupled between a host and two NoC layers, is to select which of the two NoC layers are to be used to transmit a first outgoing message from the outgoing messages.

2. The hardware element of claim 1, wherein ones of the physical links have different sizes than other ones of the physical links, wherein the plurality of configurable bypass links are incorporated on the plurality of virtual links within the physical links such that output ones of the plurality of virtual links are a same size as input ones of the plurality of virtual links.

3. The hardware element of claim 1, wherein the hardware element is a configurable router.

4. A hardware element incorporated into a System on Chip (SoC), the hardware element comprising:
    a plurality of physical links and a plurality of virtual links;
    a queue to transmit output messages to output ports of the hardware element;
    an arbiter configured to process input messages from input ports to the queue based on a logic scheme;
    bypass logic configured to redirect the input messages to a configurable bypass link, the configurable bypass link being coupled between the plurality of virtual links, to bypass the queue and the arbiter; and
    a plurality of configurable bypass links to bypass the queue and the arbiter, the plurality of configurable bypass links to provide a pathway from the bypass logic to the output ports through the plurality of physical links, wherein a configurable router of the SoC is to provide configurability of which bypass link from the plurality of configurable bypass links are available to bypass the queue and the arbiter, wherein the configurable router is to couple any input port to an output port with a direct bypass, wherein bridge logic, coupled between a host and two NoC layers, is to select which of the two NoC layers are to be used to transmit a first outgoing message from the outgoing messages.

5. The hardware element of claim 4, wherein ones of the physical links have different sizes than other ones of the physical links, wherein the plurality of configurable bypass links are incorporated on the plurality of virtual links within the physical links such that output ones of the plurality of virtual links are a same size as input ones of the plurality of virtual links.

6. The hardware element of claim 4, wherein the hardware element is a configurable router.

7. The hardware element of claim 3, wherein the configurable router comprises the output ports.

8. The hardware element of claim 3, wherein a host is coupled to a router of the SoC via injection and ejection ports while the router is coupled to other routers of the SoC via direction ports.

9. The hardware element of claim 3, wherein the hardware element is to refrain from transmission of a data packet on any of the plurality of virtual links until a virtual channel (VC) credit is available.

10. The hardware element of claim 1, wherein the configurable router comprises the output ports.

11. The hardware element of claim 1, wherein a host is coupled to a router of the NoC via injection and ejection ports while the router is coupled to other routers of the NoC via direction ports.

12. The hardware element of claim 1, wherein the hardware element is to refrain from transmission of a data packet on any of the plurality of virtual links until a virtual channel (VC) credit is available.

13. One or more non-transitory computer-readable media comprising one or more instructions that when executed on a processor configure the processor to perform one or more operations to cause:
    a queue to transmit for transmission of output messages to output ports of the hardware element;
    an arbiter to process input messages from input ports to the queue based on a logic scheme;
    bypass logic to redirect the input messages to a configurable bypass link, the configurable bypass link being coupled between a plurality of virtual links, to bypass the queue and the arbiter; and
    a plurality of configurable bypass links to bypass the queue and the arbiter, the plurality of configurable bypass links to provide a pathway from the bypass logic to the output ports through a plurality of physical links, wherein a configurable router of the NoC is to provide configurability of which bypass link from the plurality of configurable bypass links is available to bypass the queue and the arbiter, wherein the configurable router is to couple any input port to an output port with a direct bypass, wherein bridge logic, coupled between a host and two NoC layers, is to select which of the two NoC layers are to be used to transmit a first outgoing message from the outgoing messages.

14. The one or more computer-readable media of claim 13, further comprising one or more instructions that when executed on the at least one processor configure the at least one processor to perform one or more operations to cause the bypass logic to redirect the input messages to the configurable bypass link opportunistically.

15. The one or more computer-readable media of claim 13, wherein the configurable router comprises the output ports.

16. One or more non-transitory computer-readable media comprising one or more instructions that when executed on a processor configure the processor to perform one or more operations to cause:
    a queue to transmit for transmission of output messages to output ports of the hardware element;
    an arbiter configured to process input messages from input ports to the queue based on a logic scheme;
    bypass logic configured to redirect the input messages to a configurable bypass link, the configurable bypass link being coupled between a plurality of virtual links, to bypass the queue and the arbiter; and a plurality of configurable bypass links to bypass the queue and the arbiter, the plurality of configurable bypass links to provide a pathway from the bypass logic to the output ports through the plurality of physical links, wherein a configurable router of the SoC is to provide configurability of which bypass link from the plurality of configurable bypass links is available to bypass the queue and the arbiter, wherein the configurable router is to couple any input port to an output port with a direct bypass, wherein bridge logic, coupled between a host and two NoC layers, is to select which of the two NoC layers are to be used to transmit a first outgoing message from the outgoing messages.

17. The one or more computer-readable media of claim 16, further comprising one or more instructions that when executed on the at least one processor configure the at least one processor to perform one or more operations to cause the bypass logic to redirect the input messages to the configurable bypass link opportunistically.

18. The one or more computer-readable media of claim 16, wherein the configurable router comprises the output ports.

19. The hardware element of claim 1, wherein the bridge logic is to send the first outgoing message to the selected NoC layer from the two NoC layers.

* * * * *